US012307203B2

(12) United States Patent
Goslin et al.

(10) Patent No.: US 12,307,203 B2
(45) Date of Patent: May 20, 2025

(54) ARTIFICIAL INTELLIGENCE-BASED ROLEPLAYING EXPERIENCES BASED ON USER-SELECTED SCENARIOS

(71) Applicant: Disney Enterprises, Inc., Burbank, CA (US)

(72) Inventors: Michael P. Goslin, Sherman Oaks, CA (US); Jason A. Yeung, Glendale, CA (US); Timothy M. Panec, Studio City, CA (US); Corey D. Drake, Sunland, CA (US); Hunter J. Gibson, Burbank, CA (US); Jerry W. Rees, Glendale, CA (US); Raymond J. Scanlon, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1191 days.

(21) Appl. No.: 16/573,789

(22) Filed: Sep. 17, 2019

(65) Prior Publication Data

US 2021/0081498 A1 Mar. 18, 2021

(51) Int. Cl.
*A63F 13/00* (2014.01)
*A63F 13/822* (2014.01)
*G06F 18/21* (2023.01)
*G06F 40/279* (2020.01)
*G06F 40/35* (2020.01)
(Continued)

(52) U.S. Cl.
CPC .......... *G06F 40/279* (2020.01); *A63F 13/822* (2014.09); *G06F 18/2178* (2023.01); *G06F 40/35* (2020.01); *G06N 5/043* (2013.01); *G06N 20/00* (2019.01)

(58) Field of Classification Search
CPC ................... A63F 13/822; A63F 13/67; A63F 2300/6027; G06F 40/35; G06F 40/279; G05B 13/0265
See application file for complete search history.

(56) References Cited

U.S. PATENT DOCUMENTS 9,861,887 B1  1/2018  Briggs et al.
10,223,636 B2  3/2019  Reddy et al.
10,713,543 B1 *  7/2020  Skuin .................... G06N 20/00
(Continued)

FOREIGN PATENT DOCUMENTS

CN  108837511 A  11/2018
WO  2017221138 A1  12/2017

OTHER PUBLICATIONS

Orkin, J., "Collective Artificial Intelligence: Simulated Role-Playing from Crowdsourced Data", Massachusetts Institute of Technology, Feb. 2013, 178 pages <https://dam-prod.media.mit.edu/x/files/thesis/2013/jorkin-phd.pdf>.

*Primary Examiner* — Dmitry Suhol
*Assistant Examiner* — Jason Pinheiro
(74) *Attorney, Agent, or Firm* — Patterson + Sheridan, LLP

(57) ABSTRACT

Embodiments provide interactive artificial intelligence. Input to an artificial intelligence (AI) system is received, where the AI system comprises a plurality of machine learning (ML) models. A context of the input is determined, where the context indicates a role-playing scenario. A first ML model of the plurality of ML models is then selected based on the determined context, where the first ML model was trained based at least in part on the role-playing scenario. Output is generated by processing the input using the first ML model. The output is then returned.

20 Claims, 6 Drawing Sheets

(51) Int. Cl.
    *G06N 5/043*           (2023.01)
    *G06N 20/00*          (2019.01)

(56)           References Cited

U.S. PATENT DOCUMENTS

| | | | |
|---|---|---|---|
| 10,805,029 B2* | 10/2020 | Beckett, III | G06N 20/00 |
| 10,807,004 B2* | 10/2020 | Aghdaie | G06Q 10/04 |
| 10,918,941 B2* | 2/2021 | Kolen | A63F 13/30 |
| 10,940,393 B2* | 3/2021 | Somers | A63F 13/67 |
| 10,949,325 B1* | 3/2021 | Culibrk | G06F 11/3612 |
| 11,065,549 B2* | 7/2021 | Rico | G06F 18/24 |
| 11,110,353 B2* | 9/2021 | Somers | A63F 13/67 |
| 11,276,216 B2* | 3/2022 | Borovikov | G06N 3/0472 |
| 11,413,539 B2* | 8/2022 | Aghdaie | A63F 13/67 |
| 2012/0225604 A1 | 9/2012 | Richter et al. | |
| 2013/0103624 A1* | 4/2013 | Thieberger | G06N 20/00 |
| | | | 706/12 |
| 2018/0018894 A1 | 1/2018 | Coulson, Sr. | |
| 2018/0165596 A1 | 6/2018 | Abrams et al. | |
| 2019/0004518 A1* | 1/2019 | Zhou | G06N 7/01 |
| 2019/0251603 A1* | 8/2019 | Jaatinen | G06N 3/006 |
| 2019/0291004 A1* | 9/2019 | Andall | A63F 13/798 |
| 2019/0354759 A1* | 11/2019 | Somers | G06N 3/0454 |
| 2020/0364746 A1* | 11/2020 | Longano | G06N 20/00 |
| 2021/0064965 A1* | 3/2021 | Pardeshi | A63F 13/79 |
| 2021/0225390 A1* | 7/2021 | Yuyama | H04N 21/44008 |

\* cited by examiner

ARTIFICIAL INTELLIGENCE-BASED ROLEPLAYING EXPERIENCES BASED ON USER-SELECTED SCENARIOS

BACKGROUND

The present disclosure generally relates to interactivity through machine learning, and more specifically, to interactive artificial intelligence systems using machine learning models.

Conversational agents, such as chat bots, can provide rudimentary responses to users, but typically rely on limited decision-trees with restricted scripts. Further, existing chat agents have limited scope and topics of discussion. For example, a help desk bot may respond well to IT requests, but is useless for questions about commercial products. Similarly, a bot cannot be used to respond to generic requests without sacrificing the specificity required to engage in useful discussions that are more narrowly-focused. Moreover, existing chat agents fail to provide immersive interactivity, as their limited responses and narrow scope of useful discussion are severely limiting.

SUMMARY

According to one embodiment of the present disclosure, a method is provided. The method includes receiving a first input to an artificial intelligence (AI) system, wherein the AI system comprises a plurality of machine learning (ML) models. The method further includes determining a first context of the first input, wherein the first context indicates a first role-playing scenario. Additionally, the method includes selecting a first ML model of the plurality of ML models based on the determined first context, wherein the first ML model was trained based at least in part on the first role-playing scenario. The method also includes generating a first output by processing the first input using the first ML model, and returning the first output.

According to a second embodiment of the present disclosure, a non-transitory computer-readable medium is provided. The non-transitory computer-readable medium contains computer program code that, when executed by operation of one or more computer processors, performs an operation. The operation includes receiving a first input to an artificial intelligence (AI) system, wherein the AI system comprises a plurality of machine learning (ML) models. The operation further includes determining a first context of the first input, wherein the first context indicates a first role-playing scenario. Additionally, the operation includes selecting a first ML model of the plurality of ML models based on the determined first context, wherein the first ML model was trained based at least in part on the first role-playing scenario. The operation also includes generating a first output by processing the first input using the first ML model, and returning the first output.

According to a third embodiment of the present disclosure, a system is provided. The system includes one or more computer processors, and a memory containing a program which when executed by the one or more computer processors performs an operation. The operation includes receiving a first input to an artificial intelligence (AI) system, wherein the AI system comprises a plurality of machine learning (ML) models. The operation further includes determining a first context of the first input, wherein the first context indicates a first role-playing scenario. Additionally, the operation includes selecting a first ML model of the plurality of ML models based on the determined first context, wherein the first ML model was trained based at least in part on the first role-playing scenario. The operation also includes generating a first output by processing the first input using the first ML model, and returning the first output.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
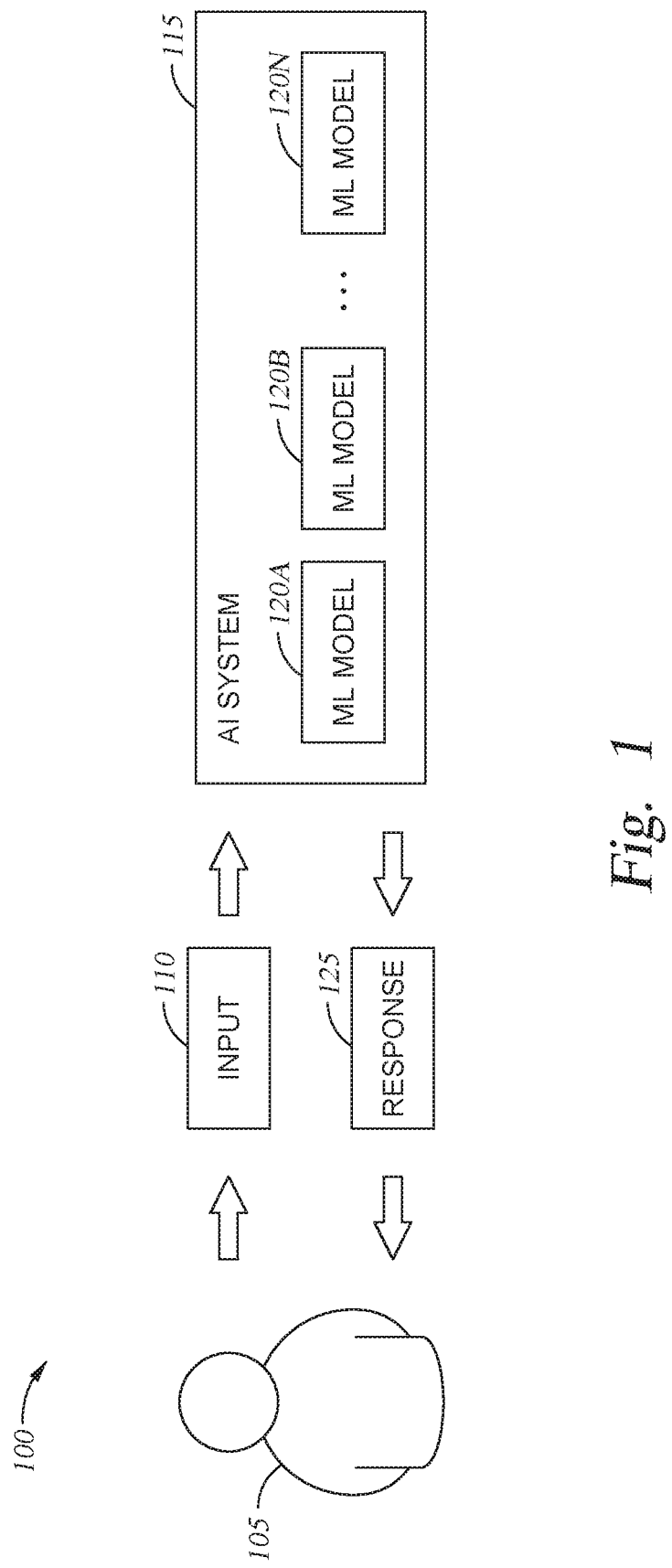
FIG. 1 illustrates a workflow for interactivity with an artificial intelligence (AI) system configured to use machine learning to interact with users, according to one embodiment disclosed herein.

Embodiments of the present disclosure provide AI systems that utilize machine learning to interact with users in a dynamic and immersive manner. In an embodiment, the AI system utilizes a collection of machine learning (ML) models, each trained on specified context or scope. In this way, each ML model can be narrowly-tailored, while the AI system retains broad applicability. In such an embodiment, the AI system determines the context of a given input, and generates responses using one or more ML models that correspond to that context. In one embodiment, the AI system can dynamically select ML models as the context of the interaction shifts, in order to continue to provide deep conversation.

In some embodiments, the AI system acts as an intelligent character in a role-playing game. In one embodiment, the AI system infers the context of the conversation based on input as the user interacts with the character. For example, in one embodiment, the AI system uses natural language processing (NLP) and/or natural language understanding (NLU) to attempt to identify role-playing scenario the user is partaking in. In one such embodiment, the AI system can utilize techniques including keyword identification, sentiment analysis, intent evaluation, parsing to determine meaning, and the like. In an embodiment, a role-playing scenario is an interactive session that includes a role for the user to play, an objective for the user to pursue, and/or a means that the user should use to achieve the objective. In embodiments, the role can include any character, such as a child, a strong warrior, a wise wizard, a stealthy archer, and the like. Similarly, objectives can include any goal, such as infiltrating a secure area, questioning or interrogating a character for information, retrieving items, rescuing characters, and the like. Further, the means can similarly include any methodology of achieving the objective, such as stealth, force, intimidation, flattery, diversion, distraction, and the like.

In some embodiments, the user plays a more specific role, such as a particular character from a movie or television show. In one such embodiment, the user is expected to understand the personality of the selected role, and must "stay in character" (e.g., by using an appropriate means) to achieve the objective. In one embodiment, each role of the user is related or correlated to an expected or anticipated means or approach. For example, an "intellect" means may correspond to a "wizard" character, while an "intimidation" means corresponds to a "knight" character. In one embodiment, the AI system responds in part based on whether the determined means the user is relying on aligns with the expected means for the determined role the user is playing. Similarly, in some embodiments, each objective corresponds to a suggested or best means or role.

In one embodiment, in order to respond based on the alignment between the expected means and the actual means the user is utilizing, the AI system uses one or more fitness functions to ensure the output makes logical sense. In an embodiment, the AI system similarly uses a fitness function to ensure that the output is authentic to a particular character (e.g., the character that the AI system is playing). In embodiments, this system can also be used to evaluate input from the user. For example, suppose the user is roleplaying as a particular character from a movie or series. In one such embodiment, the fitness function can evaluate each line corresponding to the character from the movie, show, or other predefined script, and then evaluate the user input to determine a mathematical distance between the user's word choice and phrasing, as compared to the "canonical" phrases. Based on this distance, the AI system can determine whether the user is accurately playing the role.

In some embodiments, the AI system utilizes NLP and/or NLU to determine the objective, role, and/or means the user is using for the role-playing scenario. For example, the AI system may search for keywords in user input that have predefined associations with a role, means, and/or objective. In some embodiments, some or all of the context may be known or provided to the AI system. For example in one embodiment, the user can select one or more aspects of the scenario (e.g., the objective, the role, and/or the means), and the AI system can infer the remaining aspects. In some embodiments, the AI system repeatedly determines the context for each input (which may include analyzing prior input), such that the AI system can respond to shifting contexts (e.g., if the user switches from a stealth methodology to a brute-force methodology).

In one embodiment, once the context of a given input is determined, the AI system selects a corresponding ML model to process the input. In some embodiments, the input comprises natural language, and may include text and/or audio input. In one embodiment, the AI system includes a respective ML model trained for each role-playing scenario (e.g., trained for each combination of objective, role, and means). In such an embodiment, once the scenario is identified, the AI system can select the corresponding ML model for evaluating the input. This can allow each model to be specialized with a constrained context, while allowing the AI system to dynamically shift between contexts by selecting other models.

In some embodiments, the AI system can select different ML models for the same context. For example, in one embodiment, the AI system may periodically or randomly use a different ML model for a given context, and evaluate the user's response. That is, for a given a first context C, the AI system may determine to use an ML model trained on context C' to generate the response. The AI system can then analyze how the user responds, in order to determine whether the ML model corresponding to context C' should be used at least occasionally in the future, given context C. For example, the system may determine whether the user liked the response, or appeared confused or frustrated. This evaluation can include receiving user feedback (e.g., a thumbs up or thumbs down, a score, and the like) and/or using NLP and/or NLU to analyze the user's response (e.g., to determine the sentiment).

In one embodiment, in order to improve responses and user-engagement, the learning system can provide differing responses to different users. In an embodiment, the AI system can sometimes reach better solution by randomly (or pseudo-randomly) changing the order of things, prioritizing something that was previously lower priority, and the like. This is especially true for character responses, as a response may be interpreted as funnier, even if seemingly less appropriate, for the role. Further, such randomness can allow the AI system to present characters that seem more alive, as they will not be entirely predictable. Additionally in embodiments, this randomness enables the AI system to continue searching for better solutions. For example, the system may be at a local maxima for a solution, but there can be one or more better global maxima available which can be discovered through occasional random selections.

In some embodiments, the AI system uses a constant mapping from the determined context to the corresponding ML model. In another embodiment, the AI system maintains context-specific weights for each ML model. In such an embodiment, given an input context, the AI system can probabilistically select a ML model to use based on the context-specific weight associated with each. Further, in an embodiment, the AI system can modify these context-specific weights based on user feedback, in order to better select ML models for future interactions.

FIG. 1 illustrates a workflow 100 for interactivity with an artificial intelligence (AI) system configured to use machine learning to interact with users, according to one embodiment disclosed herein. In the illustrated workflow 100, a User 105 provides Input 110 to the AI System 115. In embodiments, the Input 110 include natural language, and may include text (e.g., typed by the User 105) or audio speech data (e.g., recorded by a microphone). In one embodiment, if the Input 110 is audio, the AI System 115 utilizes speech-to-text techniques, and processes the resulting text. As illustrated, the AI System 115 includes a set of ML Models 120A-N. In one embodiment, each ML Models 120 corresponds to a finite state machine, a decision tree, and the like. In another embodiment, each ML Model 120 corresponds to a machine learning model that was trained to receive textual input and generate or select a corresponding output. In one embodiment, this output includes dynamically generated text or audio. In another embodiment, the output corresponds to text or audio that is selected from a predefined set of responses.

In one embodiment, each ML Model 120A-N was trained based on training data corresponding to a given context (e.g., a specific combination of role, means, and objective). For example, the ML Model 120A may be trained based on training data corresponding to an "alien" role using "intimidation" means for an "interview" objective, while the ML Model 120B may be trained using data corresponding to the same role and objective, but with a "flattery" means. In one embodiment, the AI System 115 determines the context of the Input 110, in order to select an appropriate ML Model 120A-N. In some embodiments, the training data includes sample input phrases used as input, as well as corresponding target output phrases to train each model.

In one embodiment, the AI System 115 determines the context of the Input 110 based at least in part on prior user selection. For example, the User 105 may select an objective, role, and/or means prior to beginning the interaction. In some embodiments, the AI System 115 uses NLP and/or NLU (e.g., performed on audio, text, and/or combinations thereof) to determine some or all of the context of the Input 110. For example, the user may select an objective, and the AI System 115 uses NLP to identify the means the user is pursuing, and/or to infer the character or role the user is playing. In some embodiments, once the context is determined, the AI System 115 selects the corresponding ML Model 120. In another embodiment, the AI System 115 periodically or probabilistically selects an ML Model 120, which may not be the model associated with a perfectly matching context. For example, the AI System 115 may rely on weights associated with each ML Model 120 in determining which model to select. In another embodiment, the AI System 115 may select one aspect of the context to change, and select the corresponding ML Model 120 for this changed aspect. For example, despite the user using an "intimidation" means, the AI System 115 may spontaneously decide to use a model trained on a "flattery" means to generate a given response. In one embodiment, this random or pseudorandom selection can improve the AI System 115. For example, if user's rate the "flattery" response higher for entertainment value, the system can learn to use this model more often, given the context.

As illustrated, once the AI System 115 has selected a ML Model 120, the Input 110 is provided as input in order to generate a corresponding Response 125. In one embodiment, the selected ML Model 120 dynamically generates output text based on weights learned during the training phase. In another embodiment, the ML Model 120 acts as a classifier to classify the input, and uses corresponding predefined text for that category as the output. In some embodiments, the Response 125 is a text string including natural language. In one embodiment, the AI System 115 uses one or more text-to-speech techniques to generate audio output, which is used as the Response 125. In an embodiment using a classifier as the ML Model 120, the AI System 115 may output pre-recorded phrases as the Response 125.

As illustrated, these Responses 125 are provided to the User 105. In turn, the User 105 may provide additional Input 110. In this way, the User 105 and AI System 115 can interact during the role-playing scenario until the User 105 quits, or until predefined criteria are met. For example, one such criterion may include determining, by the AI System 115, that the objective has been accomplished or failed.

Figure 2:
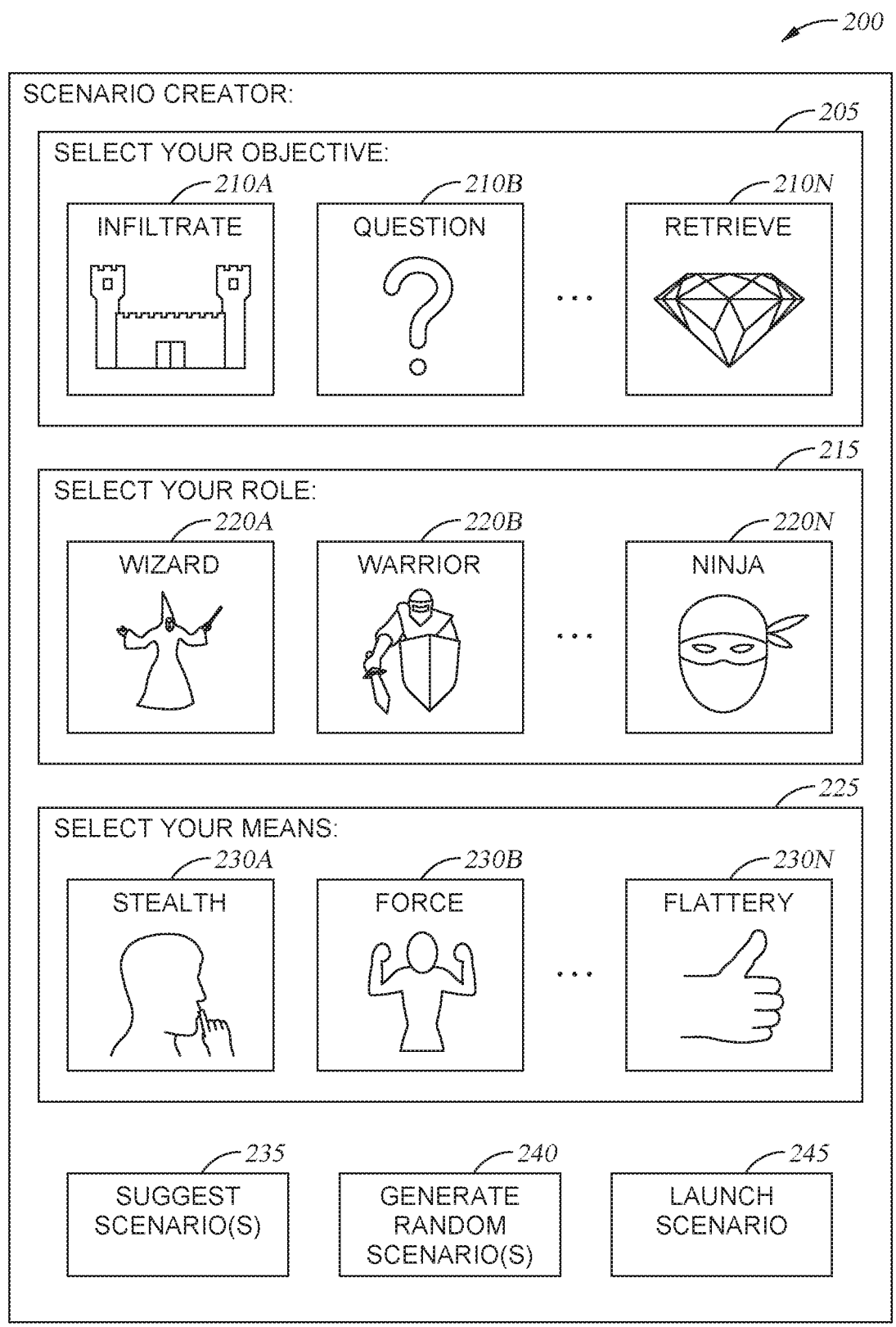
FIG. 2 depicts an example graphical user interface (GUI) used to interact with an AI system configured to use machine learning to respond to users, according to one embodiment disclosed herein.

FIG. 2 depicts an example graphical user interface (GUI) 200 used to interact with an AI system configured to use machine learning to respond to users, according to one embodiment disclosed herein. In the illustrated embodiment, the user interacts with a scenario creator to select one or more aspects of the role-playing scenario they wish to use. As illustrated, the user can select, in a first Box 205, an Objective 210A-N. In the illustrated embodiment, the Objectives 210 can include, without limitation, an "Infiltrate" Objective 210A, a "Question" Objective 210B, and a "Retrieve" Objective 210N. Of course, in embodiments, there may be any number of Objectives 210 to choose from. In one embodiment, the Objective 210 is selected from a predefined set.

Further, using the Box 215, the user can select a Role 220A-N. In the illustrated embodiment, the user can select a Wizard 220A, a Warrior 220B, and a Ninja 220N. Of course, there may be any number of Roles 220 for selection. Additionally, using the Box 225, the user can select a Means 230A-N, including Stealth 230A, Force 230B, and Flattery 230N. Of course, there may be any number of Means 230 for selection. In one embodiment, the Roles 220 and Means 230 are similarly selected from predefined sets. In the illustrated embodiment, the user can select one or more of the options, and use the Button 245 to launch the selected scenario. In some embodiments, the user may select only a subset of the aspects, and leave the AI System 115 to infer the remaining. For example, the user may select an Objective 210 and a Role 220, but not instruct the AI System 115 as to the Means 230 they will use. Similarly, the user may select an Objective 210, but refrain from informing the AI System 115 of the Role 220 or Means 230.

In some embodiments, the options available for a given selection can depend on one or more other selections. That is, the selections for each of the Objectives 210, Roles 220, and/or Means 230 may have predefined relationships defining combinations that can be selected. For example, in such an embodiment, the choice of available Roles 220 may depend on the Objective 210 selected. Similarly, the available Means 230 may depend on the Objective 210 and/or the Role 220.

In the illustrated embodiment, the GUI 200 further includes a Button 235 to generate suggested scenarios, a Button 240 to generate random scenarios, and a Button 245 to launch the selected or suggested scenario. In an embodiment, the Button 235 is used to generate suggested scenarios based on the user's previous interactions with the system. In one embodiment, each user has a corresponding user profile that maintains interaction history for the user, such as the scenarios they have previously engaged in (e.g., the objective, role, and/or means they used), the length of time they have spent interacting during each scenario, and the like. In some embodiments, the system generates suggested scenarios for the user based on this profile.

In one embodiment, the suggested scenario is based in part on the number of times a given selection has been used by the user, and/or how recently the selection has occurred. For example, in one such embodiment, the system may determine that the user frequently selects a particular objective, and suggest that the user play a scenario involving this objective (perhaps with a different role or means compared to the user's typical selection). Similarly, in some embodiments, the system can suggest that the user select a different objective, role, and/or means (e.g., one they have not played often, recently, or at all). In some embodiments, the suggestion is based in part on the length of time the user spends in each scenario. For example, if the user tends to interact with the system for a longer period of time when playing as a wizard, relative to when the user plays as a warrior, the system may suggest that the user select the wizard character.

In the illustrated embodiment, the Button 245 is used to begin the interactive scenario that has been selected and/or generated. In some embodiments, this may include opening one or more other windows (e.g., a chat window), activating one or more input devices (e.g., a keyboard and/or a microphone), and the like. In an embodiment, as the user interacts with the system in the scenario, the system maintains data about the interaction, such as the length of time the scenario lasts (e.g., until the user succeeds, fails, or ends the scenario), the result of the scenario (e.g., whether the user succeeded, failed, or quit), and the like. In some embodiments, the system further utilizes techniques such as NLP to perform semantic analysis in order to determine whether the user enjoyed the scenario. In an embodiment, this data is maintained in the profile of the user.

Figure 3:
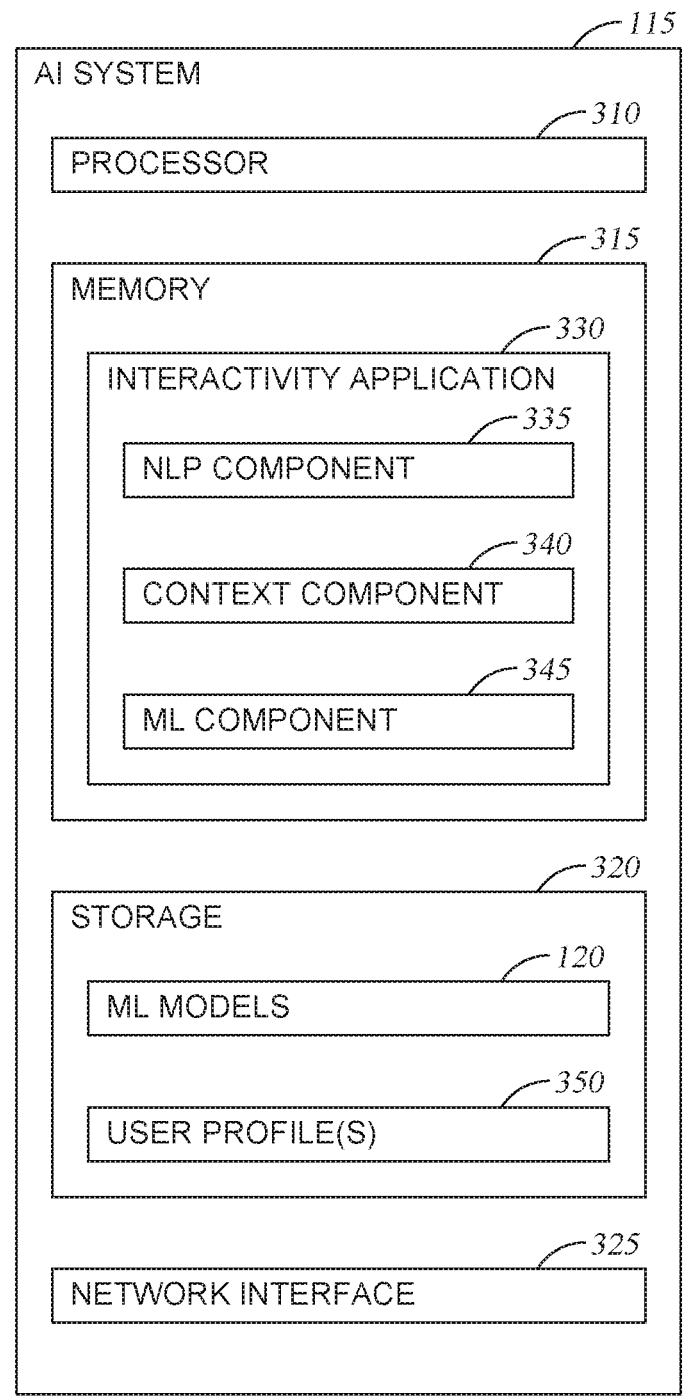
FIG. 3 is a block diagram illustrating conceptual components of an AI system configured to use machine learning to interact with users, according to one embodiment disclosed herein.

FIG. 3 is a block diagram illustrating conceptual components of an AI System 115 configured to use machine learning to interact with users, according to one embodiment disclosed herein. Although illustrated as a discrete computing device, in embodiments, the operations of the AI System 115 may be implemented as a virtual machine, as software (e.g., executing in a cloud environment), distributed across several devices, and the like. As illustrated, the AI System 115 includes a Processor 310, a Memory 315, Storage 320, and a Network Interface 325. In the illustrated embodiment, Processor 310 retrieves and executes programming instructions stored in Memory 315 as well as stores and retrieves application data residing in Storage 320. Processor 310 is representative of a single CPU, multiple CPUs, a single CPU having multiple processing cores, and the like. In some embodiments, the Processor 310 includes one or more graphics processing units (GPUs). Memory 315 is generally included to be representative of a random access memory. Storage 320 may be a disk drive or flash-based storage device, and may include fixed and/or removable storage devices, such as fixed disk drives, removable memory cards, or optical storage, network attached storage (NAS), or storage area network (SAN). Via the Network Interface 325, the AI System 115 can be communicatively coupled with one or more other devices and storage repositories.

In the illustrated embodiment, the Storage 320 includes one or more ML Models 120, as well as User Profiles 350. Although depicted as residing in Storage 320, in embodiments, the ML Models 120 and User Profiles 350 may be located in any suitable location, including in Memory 315, in a cloud storage location, and the like. In one embodiment, each ML Model 120 includes a set of learned weights or other parameters that were learned during a training phase, based on labeled training data. For example, during training, each ML Model 120 can be refined by adjusting weighted paths in a decision tree, tweaking a genetic algorithm, modifying a rules-based system, and the like.

In an embodiment, the training data includes, for example, samples of input text and a corresponding output text for each sample of input text. For example, in one embodiment, the training data is collected from roleplaying sessions between users (e.g., as part of a development team), and/or from early test users. In such an embodiment, the input from each user can be used as either exemplar input or target output, depending on the particular model being trained (e.g., depending on which role the AI system will be playing, and which role the user will be playing). In one embodiment, the same set of training data can be used to train two ML Models 120, one for each side of the conversation. In this way, the AI System 115 can be trained to play two different roles based on a single set of training data. In some embodiments, a separate set of training data is used for each ML Model 120, where each set of training data is associated with a respective context (e.g., a role-playing scenario).

In one embodiment, the context of a set of training data is the role-playing scenario that the training data corresponds to. For example, a first piece of training data may include one or more textual inputs, along with corresponding responses, that were recorded during a role-playing experience (e.g., between users, writers, actors, or other humans). That is, in one embodiment, the training data is collected by recording textual interactions between people (e.g., two writers role-playing as part of a scenario). In such an embodiment, the context of this first piece of training data can include identifiers for the objective, role, and/or means that the users were engaging in when the text was recorded. In this way, each ML Model 120 can be trained based on the particular underlying scenario, which can improve responses for the given scenario.

In an embodiment, each ML Model 120 is labeled or otherwise associated with the context that corresponds to the underlying training data. In this way, the AI System 115 can selectively use each ML Model 120 based on their specific contexts (e.g., based on matching the context of the current input with the ML Models 120) to generate deeper and more specific responses within each context.

In the illustrated embodiment, the Memory 315 includes an Interactivity Application 330. Although depicted as software residing in Memory 315, in embodiments, the functionality of the Interactivity Application 330 can be implemented using software, hardware, or a combination of software and hardware. Similarly, the Interactivity Application 330 may reside in any suitable location. As illustrated, the Interactivity Application 330 includes a NLP Component 335, a Context Component 340, and a ML Component 345. Although depicted as discrete components for conceptual clarity, in embodiments, the operations of the NLP Component 335, Context Component 340, and ML Component 345 may be combined or distributed across any number of components.

In an embodiment, the NLP Component 335 generally receives input and processes it using one or more NLP techniques. In some embodiments, the NLP Component 335 receives the input as audio (e.g., recorded speech from a user) and utilizes one or more speech-to-text methods to generate a textual input. In another embodiment, the NLP Component 335 receives textual input (e.g., from a user, or from another component that converted audio to text). In some embodiments, the NLP Component 335 performs a variety of NLP processing such as sentiment analysis, keyword detection, parsing to determine intent or meaning, and the like. For example, the NLP Component 335 may perform sentiment analysis to determine whether the user is enjoying the ongoing scenario. In some embodiments, the ML Models 120 can be refined based on this analysis, as discussed below in more detail. In one embodiment, once the NLP Component 335 has determined the intent and/or sentiment, identified keywords, or performed any other NLP processing, some or all of the resulting data is passed as input to the ML Models 120.

In the illustrated embodiment, the Context Component 340 determines the current context of the user input, in order to facilitate selection of an appropriate ML Model 120. In one embodiment, the Context Component 340 does so at least in part by evaluating results output by the NLP Component 335. This may include data relating to the most recent input, as well as from one or more prior inputs. In one embodiment, the Context Component 340 infers the user's objective, role, and/or means based on identified keywords, or based on other results from the NLP Component 335. For example, in one such embodiment, the Context Component 340 can determine that the objective is to retrieve an item, based on determining that predefined keywords relating to the item were included in one or more inputs received from the user. Similarly, the Context Component 340 may determine that the user is roleplaying as a particular character or is using a particular means, based on keywords, and/or based on the sentiment or intent of the input(s), as identified by the NLP Component 335.

In another embodiment, the Context Component 340 may determine the context based at least in part on the original input provided by the user (e.g., the explicit selection(s) the user made in initiating the scenario). In some embodiments, the Context Component 340 performs this context identification for each received input in the scenario. That is, in such an embodiment, even if the Context Component 340 has already inferred the context with a high degree of confidence (or determined it conclusively based on explicit user-selection), the Context Component 340 continues to evaluate the context for each received input. In this way, the Context Component 340 can determine whether the user has shifted the role-playing scenario (such as by deciding to attempt a different means to achieve the objective).

For example, suppose the user previously attempted to use a "flattery" approach, but has decided to attempt a "force" approach to achieve the objective. In an embodiment, the Context Component 340 may identify this transition and select a different ML Model 120 (e.g., based on keywords in the current input, based on sentiment analysis on the input, based on intent analysis, and the like). In some embodiments, some or all of the selections are not changeable during the interaction. For example, the Context Component 340 may infer that the user is attempting to play as a different role, or pursue a different objective. In one embodiment, the Context Component 340 can allow this change and the role-playing scenario will be shifted accordingly (e.g., by selecting other ML Models 120).

In another embodiment, the Context Component 340 can continue to output the previous context. For example, the Context Component 340 can determine that the user is switching roles, but may nevertheless indicate, to the ML Component 345, that the role remains the same (e.g., because predefined rules indicate that the role cannot be changed mid-scenario). In embodiments, once the Context Component 340 has determined the current context (e.g., the objective, role, and means), the Context Component 340 provides an indication to the ML Component 345 reflecting these determinations.

In the illustrated embodiment, the ML Component 345 receives the current context from the Context Component 340, and selects one or more of the ML Models 120 based on this context. In one embodiment, the ML Component 345 identifies and selects the ML Model 120 that is associated with a matching context. In some embodiments, the ML Component 345 may select one or more other ML Models 120 (e.g., periodically, or in a probabilistic manner). For example, in one embodiment, the ML Models 120 are associated with context-specific weights, indicating a likelihood that each will be selected given a particular context. In such an embodiment, given a first context C, a first ML Model 120 (e.g., one trained on the same context C) may be associated with a relatively high weight, such that it will be selected frequently. Similarly, a second ML Model 120 (trained on a different context) can be associated with a relatively lower weight, such that it is selected less frequently than the first. In some embodiments, the weight of each ML Model 120 is determined based in part on the vector distance between the current context C and the respective context C' of each respective ML Model 120.

In an embodiment, the weight of each ML Model 120 is determined on a per-context basis, such that a particular ML Model 120 can have a first weight with respect to a first input context C, and a second weight with respect to a second input context C'. In one embodiment, this context-specific weight is fixed. In some embodiments, however, the ML Component 345 can dynamically modify the context-specific weights of each ML Model 120 during use. In one embodiment, after using a particular ML Model 120 to generate a response, the ML Component 345 evaluates the user's next input in order to refine the context-specific weight(s) associated with the ML Model 120. For example, if the user-response is positive (e.g., with a positive sentiment evaluation from the NLP Component 335), the ML Component 345 may increase the weight of the previously-selected ML Model 120, in order to increase the probability that it will be selected in the future, given the same context. Similarly, if the user's subsequent response is negative, the ML Component 345 may reduce the weight of the previously-selected ML Model 120.

In one embodiment, in addition to receiving the current context from the Context Component 340, the ML Component 345 receives results of the NLP analysis from the NLP Component 335. In an embodiment, once an ML Model 120 has been selected, the ML Component 345 provides this input to the selected model in order to generate an output. In one embodiment, the ML Model 120 dynamically generates an output, which may be textual, audio, text converted to audio using text-to-speech models, and the like. In some embodiments, the ML Model 120 is trained as a classifier that receives input (e.g., text, the results of one or more NLP processes, and the like) and select from a large set of predefined responses. These responses may similarly include textual responses and/or pre-recorded audio. During a training phase, one or more weights or other parameters of the ML Model 120 are learned based on provided training data.

In embodiments, this output is then provided to the user. In some embodiments, based on the subsequent user-input, the ML Component 345 can modify or refine the selected ML Model 120. In various embodiments, in order to determine the quality of a given output, the ML Component 345 can evaluate explicit ratings from the user, subsequent responses from the user, facial expressions or other non-verbal emotional cues (e.g., laughing) from the user, and the like. If the subsequent user input is positive, the ML Component 345 can refine the model to increase the probability that the previous output will be selected again, given the same input and/or context. Similarly, if the subsequent input is negative, the ML Component 345 reduces the probability that the ML Model 120 will select the same response again, given the previous input/context. In this way, the Interactivity Application 330 can provide immersive role-playing to the user.

Figure 4:
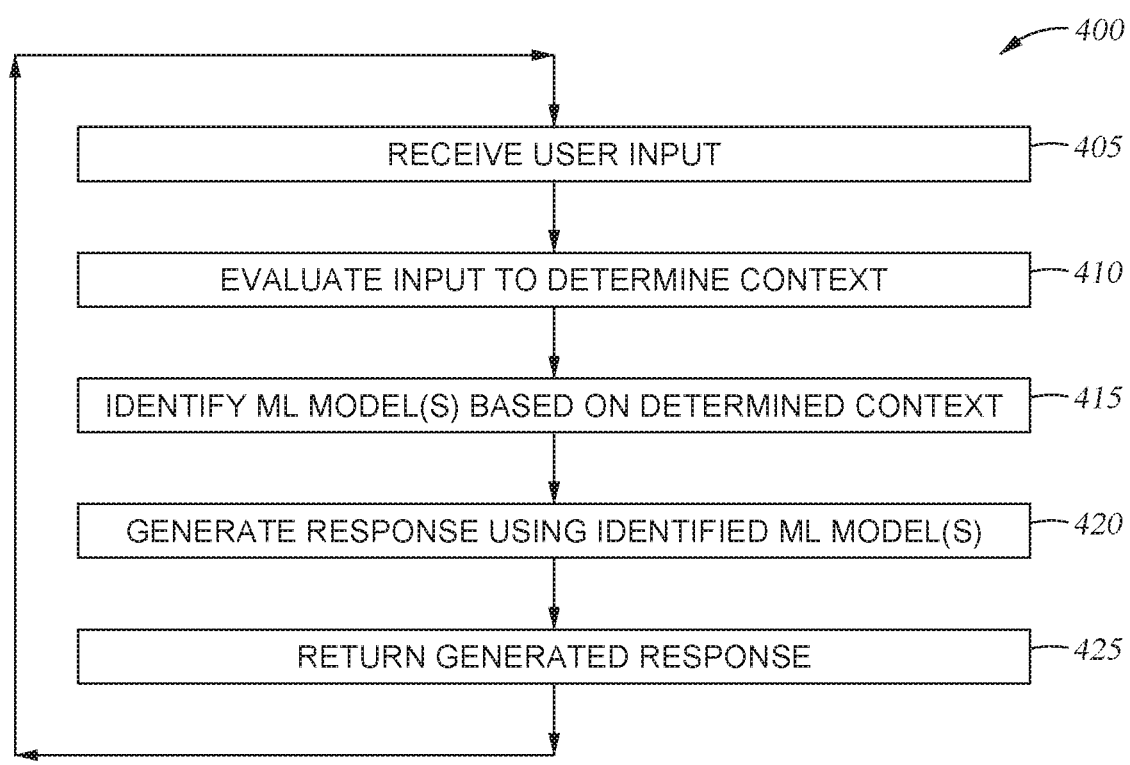
FIG. 4 is a flow diagram illustrating a method for using machine learning to interact with users, according to one embodiment disclosed herein.

FIG. 4 is a flow diagram illustrating a method 400 for using machine learning to interact with users, according to one embodiment disclosed herein. The method 400 begins at block 405, where an Interactivity Application 330 receives user input. In embodiments, this input may include textual input, audio input, and the like. At block 410, the Interactivity Application 330 evaluates the input to determine the current context. In some embodiments, this includes evaluating prior input from the user. In one embodiment, the context corresponds to a role-playing scenario, and includes details such as the objective, means to achieve the objective, and role the user is playing. In embodiments, this context may be inferred, or determined based on prior selection. In some embodiments, in addition to determining a context, the Interactivity Application 330 generates a confidence in this determination. For example, if the Interactivity Application 330 is inferring the context, the Interactivity Application 330 may further generate a corresponding confidence in order to aid selection of an appropriate ML Model 120.

The method 400 then continues to block 415, where the Interactivity Application 330 identifies and selects one or more ML Models 120 based on the determined context. In one embodiment, as discussed above, the Interactivity Application 330 selects the ML Model 120 with a matching context. In another embodiment, the Interactivity Application 330 probabilistically selects a model based on the determined context, the confidence in this determination, and the context-specific weights associated with each ML Model 120. As discussed above, in some embodiments, the Interactivity Application 330 further refines the context-specific weights of each ML Model 120, and/or the internal weights of the previously-selected model, based on the current input. The method 400 then continues to block 420.

At block 420, the Interactivity Application 330 generates a response using the identified and selected ML Model 120. In one embodiment, this includes processing the user-input with the selected ML Model 120. In another embodiment, the Interactivity Application 330 performs one or more NLP operations on the input (e.g., keyword identification, sentiment analysis, intent determination, and the like), and processes the result with the ML Model 120. In one embodiment, the ML Models 120 are trained to dynamically generate a response. In other embodiments, the models are trained to classify the input in order to select from a predefined set of responses. At block 425, the response is returned to the user (e.g., by displaying it on a screen, or by outputting audio).

This process can then be repeated until the user exits the scenario, or the scenario otherwise terminates. In one embodiment, each objective has one or more predefined termination points. In some embodiments, these termination points are associated with particular responses that may be selected by the ML Model 120. For example, if a particular response is generated by the model, the Interactivity Application 330 may determine that the scenario has ended in success or failure, and end the role-playing interaction after the response is output.

Figure 5:
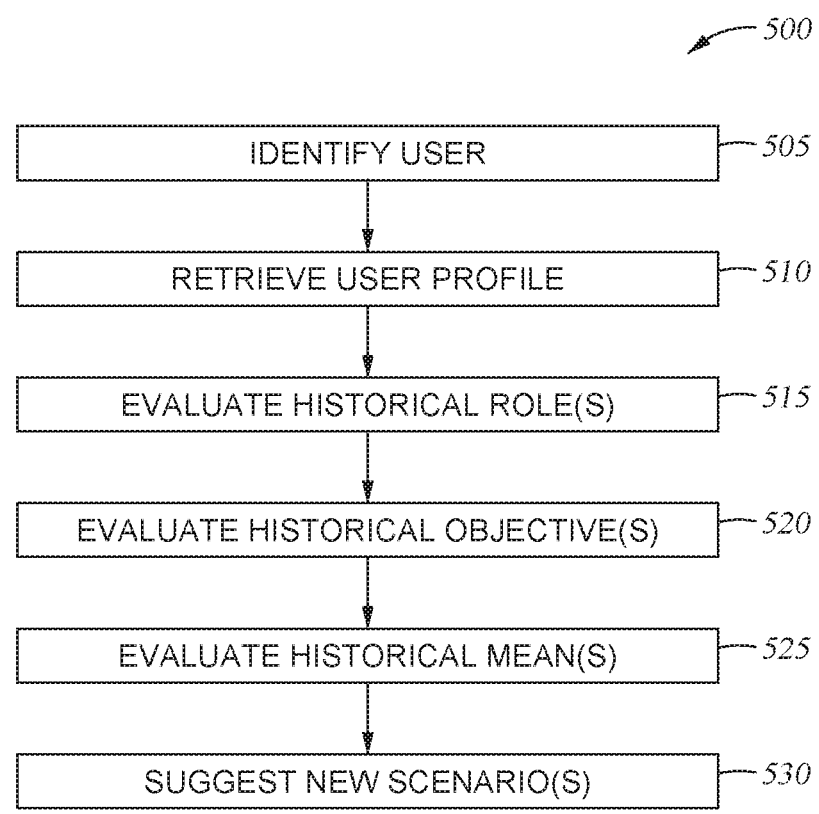
FIG. 5 is a flow diagram illustrating a method for providing dynamic interactions using machine learning, according to one embodiment disclosed herein.

FIG. 5 is a flow diagram illustrating a method 500 for providing dynamic interactions using machine learning, according to one embodiment disclosed herein. In an embodiment, the method 500 is used to generate or suggest scenarios to users. The method 500 begins at block 505, where an Interactivity Application 330 identifies the user for which the suggestion should be tailored (e.g., the user making the request). At block 510, the Interactivity Application 330 then retrieves a profile of the identified user. In one embodiment, as discussed above, the Interactivity Application 330 maintains user profiles for each user, where the user profile specifies information about previous interactions, such as the previous scenarios they have participated in, the length of time they interacted with each, and the like. The method 500 then proceeds to block 515.

At block 515, the Interactivity Application 330 evaluates the data contained in the user profile to evaluate the roles the user previously played in prior interactions. In embodiments, this can include determining, for each respective role, the number of times the user played as the role, the frequency with which the user plays as the role (as compared to other roles), how recently the user played as the respective role, the average duration of prior interactions when the user was playing as the respective role, and the like. At blocks 520 and 525, the Interactivity Application 330 performs similar evaluations of the user's prior objectives and means, respectively. In one embodiment, the Interactivity Application 330 further determines, for each such prior scenario, a level of satisfaction the user experienced. This may be determined based on user selection (e.g., indicating a rating at the end of the interaction), and/or inferred based on sentiment analysis of the user input during and/or after the interaction.

In some embodiments, the Interactivity Application 330 further considers profiles of other users. For example, in one embodiment, the Interactivity Application 330 evaluates other user profiles and/or recent interactions from other users in order to identify role(s), objective(s), and/or mean(s) have been recently used by others or that are popular among other users. At block 530, the Interactivity Application 330 generates and suggests one or more new scenarios to the user, based on the above analysis. In some embodiments, the Interactivity Application 330 infers the user's preferences based on the number of times a particular selection was used, the duration of interactivity with the selection, the average satisfaction when the selection was used, how recently the selection was used, and the like.

In some embodiments, the generated suggestions include scenarios that closely match with these preferences. In another embodiment, the Interactivity Application 330 generates at least some scenarios that differ from the preferences. In some embodiments, the Interactivity Application 330 does so by considering interactive sessions that other users have participated in and enjoyed. In one embodiment, the Interactivity Application 330 determines the user's preferred selections with respect to some factors of the scenario (e.g., the role, objective, and/or means), and selects one of these factors to change. In this way, the Interactivity Application 330 suggests scenarios that are similar to the user's preferred play style, but with differences that may better engage the user.

Figure 6:
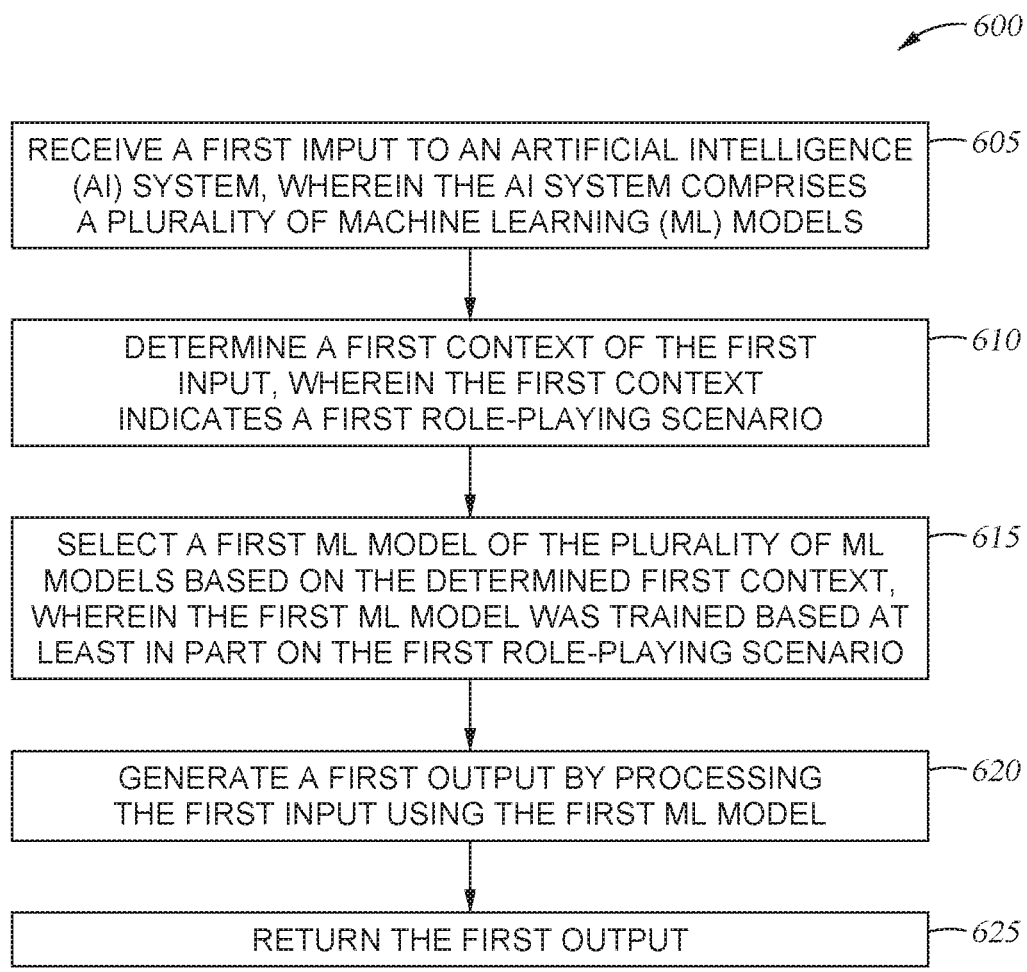
FIG. 6 is a flow diagram illustrating a method for interacting with a user using machine learning, according to one embodiment disclosed herein.

FIG. 6 is a flow diagram illustrating a method 600 for interacting with a user using machine learning, according to one embodiment disclosed herein. The method 600 begins at block 605, where the Interactivity Application 330 receives a first input to an artificial intelligence (AI) system, wherein the AI system comprises a plurality of machine learning (ML) models. At block 610, the Interactivity Application 330 determines a first context of the first input, wherein the first context indicates a first role-playing scenario. The method 600 then continues to block 615, where the Interactivity Application 330 selects a first ML model of the plurality of ML models based on the determined first context, wherein the first ML model was trained based at least in part on the first role-playing scenario. Further, at block 620, the Interactivity Application 330 generates a first output by processing the first input using the first ML model. Additionally, at block 625, the Interactivity Application 330 returns the first output.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving a first input to an artificial intelligence (AI) system, wherein the AI system comprises a plurality of machine learning (ML) models, and wherein the first input comprises natural language;
   determining a first context of the first input, wherein the first context indicates a first role-playing scenario;
   selecting a first ML model of the plurality of ML models based on the determined first context and a set of context-specific weights associated with the first ML model, wherein the first ML model was trained based at least in part on training data corresponding to a natural language interaction relating to the first role-playing scenario;
   generating a first output by processing the first input using the first ML model, wherein the first output comprises natural language;
   returning the first output; and
   refining, based on feedback for the first output, at least one of (i) one or more internal weights of the first ML model, or (ii) one or more of the set of context-specific weights associated with the first ML model.

2. The method of claim 1, wherein the first role-playing scenario specifies:

(i) a role that a user plays in the first role-playing scenario;
(ii) an objective that the user is pursuing in the first role-playing scenario; and
(iii) a means that the user is using to achieve the objective.

3. The method of claim 2, the method further comprising:
receiving a second input to the AI system;
determining, based on the second input, that the user is utilizing a second means to achieve the objective;
identifying a second role-playing scenario based on the second means, wherein the second role-playing scenario is associated with a second ML model of the plurality of ML models; and
generating a second output by processing the second input using the second ML model.

4. The method of claim 1, wherein determining the first context comprises processing the first input using one or more natural language processing (NLP) techniques to infer the first role-playing scenario, comprising performing at least one of: keyword identification, sentiment analysis, or intent evaluation.

5. The method of claim 1, the method further comprising:
identifying a user interacting with the AI system;
evaluating historical interactions of the user with the AI system;
selecting a second role-playing scenario based on the historical interactions, wherein the second role-playing scenario is associated with a second ML model of the plurality of ML models;
indicating the second role-playing scenario to the user; and
upon receiving user selection of the second role-playing scenario, processing subsequent input using the second ML model.

6. The method of claim 1, wherein the feedback comprises at least one of:
sentiment data generated based on processing a subsequent input to the AI system using one or more natural language processing (NLP) techniques,
sentiment data generated based on processing a subsequent input to the AI system using one or more natural language understanding (NLU) techniques,
a score provided by a user of the AI system, or
a binary quality indication provided by a user of the AI system.

7. The method of claim 1, further comprising:
receiving a second input to the AI system;
determining a second context of the second input, wherein the second context indicates the first role-playing scenario;
selecting a second ML model of the plurality of ML models based on the determined second context, wherein the second ML model was trained based at least in part on a second role-playing scenario distinct from the first role-playing scenario; and
generating a second output by processing the second input using the second ML model.

8. A non-transitory computer-readable medium containing computer program code that, when executed by operation of one or more computer processors, performs an operation comprising:
receiving a first input to an artificial intelligence (AI) system, wherein the AI system comprises a plurality of machine learning (ML) models, and wherein the first input comprises natural language;
determining a first context of the first input, wherein the first context indicates a first role-playing scenario;
selecting a first ML model of the plurality of ML models based on the determined first context and a set of context-specific weights associated with the first ML model, wherein the first ML model was trained based at least in part on training data corresponding to a natural language interaction relating to the first role-playing scenario;
generating a first output by processing the first input using the first ML model, wherein the first output comprises natural language; and
returning the first output; and
refining, based on feedback for the first output, at least one of (i) one or more internal weights of the first ML model, or (ii) one or more of the set of context-specific weights associated with the first ML model.

9. The computer-readable medium of claim 8, wherein the first role-playing scenario specifies:
(i) a role that a user plays in the first role-playing scenario;
(ii) an objective that the user is pursuing in the first role-playing scenario; and
(iii) a means that the user is using to achieve the objective.

10. The computer-readable medium of claim 9, the operation further comprising:
receiving a second input to the AI system;
determining, based on the second input, that the user is utilizing a second means to achieve the objective;
identifying a second role-playing scenario based on the second means, wherein the second role-playing scenario is associated with a second ML model of the plurality of ML models; and
generating a second output by processing the second input using the second ML model.

11. The computer-readable medium of claim 8, wherein determining the first context comprises processing the first input using one or more natural language processing (NLP) techniques to infer the first role-playing scenario, comprising performing at least one of: keyword identification, sentiment analysis, or intent evaluation.

12. The computer-readable medium of claim 8, the operation further comprising:
identifying a user interacting with the AI system;
evaluating historical interactions of the user with the AI system;
selecting a second role-playing scenario based on the historical interactions, wherein the second role-playing scenario is associated with a second ML model of the plurality of ML models;
indicating the second role-playing scenario to the user; and
upon receiving user selection of the second role-playing scenario, processing subsequent input using the second ML model.

13. The computer-readable medium of claim 8, wherein the feedback comprises at least one of:
sentiment data generated based on processing a subsequent input to the AI system using one or more natural language processing (NLP) techniques,
sentiment data generated based on processing a subsequent input to the AI system using one or more natural language understanding (NLU) techniques,
a score provided by a user of the AI system, or
a binary quality indication provided by a user of the AI system.

14. The computer-readable medium of claim 8, the operation further comprising:

receiving a second input to the AI system;
determining a second context of the second input, wherein the second context indicates the first role-playing scenario;
selecting a second ML model of the plurality of ML models based on the determined second context, wherein the second ML model was trained based at least in part on a second role-playing scenario distinct from the first role-playing scenario; and
generating a second output by processing the second input using the second ML model.

15. A system comprising:

one or more computer processors; and a memory containing a program which when executed by the one or more computer processors performs an operation, the operation comprising:

receiving a first input to an artificial intelligence (AI) system, wherein the AI system comprises a plurality of machine learning (ML) models, and wherein the first input comprises natural language;

determining a first context of the first input, wherein the first context indicates a first role-playing scenario;

selecting a first ML model of the plurality of ML models based on the determined first context and a set of context-specific weights associated with the first ML model, wherein the first ML model was trained based at least in part on training data corresponding to a natural language interaction relating to the first role-playing scenario;

generating a first output by processing the first input using the first ML model, wherein the first output comprises natural language; and returning the first output; and refining, based on feedback for the first output, at least one of (i) one or more internal weights of the first ML model, or (ii) one or more of the set of context-specific weights associated with the first ML model.

16. The system of claim 15, wherein the first role-playing scenario specifies: (i) a role that a user plays in the first role-playing scenario, (ii) an objective that the user is pursuing in the first role-playing scenario, and (iii) a means that the user is using to achieve the objective, and wherein the operation further comprises:

receiving a second input to the AI system;

determining, based on the second input, that the user is utilizing a second means to achieve the objective;

identifying a second role-playing scenario based on the second means, wherein the second role-playing scenario is associated with a second ML model of the plurality of ML models; and generating a second output by processing the second input using the second ML model.

17. The system of claim 15, wherein determining the first context comprises processing the first input using one or more natural language processing (NLP) techniques to infer the first role-playing scenario, comprising performing at least one of: keyword identification, sentiment analysis, or intent evaluation.

18. The system of claim 15, the operation further comprising:

identifying a user interacting with the AI system;

evaluating historical interactions of the user with the AI system;

selecting a second role-playing scenario based on the historical interactions, wherein the second role-playing scenario is associated with a second ML model of the plurality of ML models;

indicating the second role-playing scenario to the user; and upon receiving user selection of the second role-playing scenario, processing subsequent input using the second ML model.

19. The system of claim 15, wherein the feedback comprises at least one of:

sentiment data generated based on processing a subsequent input to the AI system using one or more natural language processing (NLP) techniques, sentiment data generated based on processing a subsequent input to the AI system using one or more natural language understanding (NLU) techniques, a score provided by a user of the AI system, or a binary quality indication provided by a user of the AI system.

20. The system of claim 15, the operation further comprising:

receiving a second input to the AI system;

determining a second context of the second input, wherein the second context indicates the first role-playing scenario;

selecting a second ML model of the plurality of ML models based on the determined second context, wherein the second ML model was trained based at least in part on a second role-playing scenario distinct from the first role-playing scenario; and generating a second output by processing the second input using the second ML model.

* * * * *